Sept. 28, 1965  W. B. McDOWELL  3,208,704
GAS METER MOUNTING BRACKET
Filed Nov. 6, 1963  4 Sheets-Sheet 1
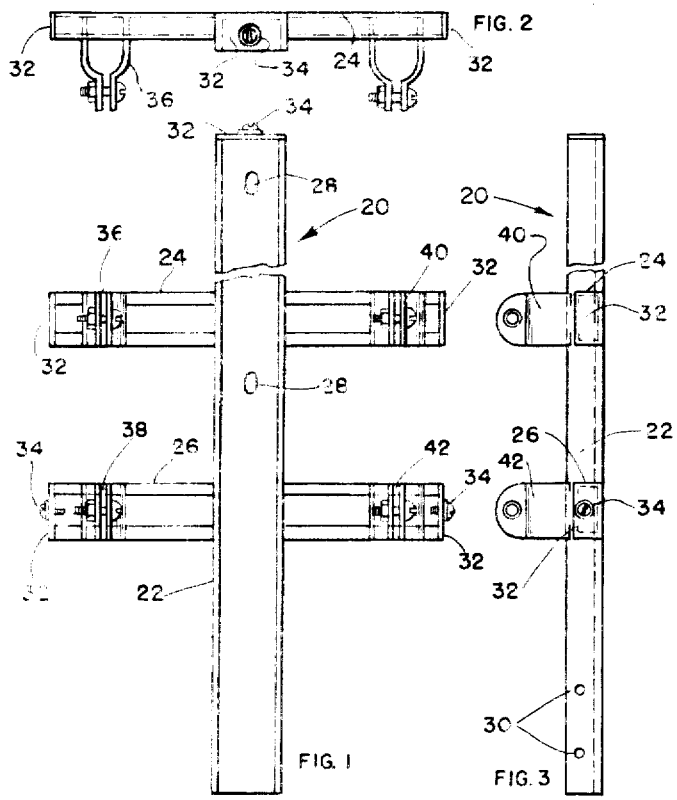
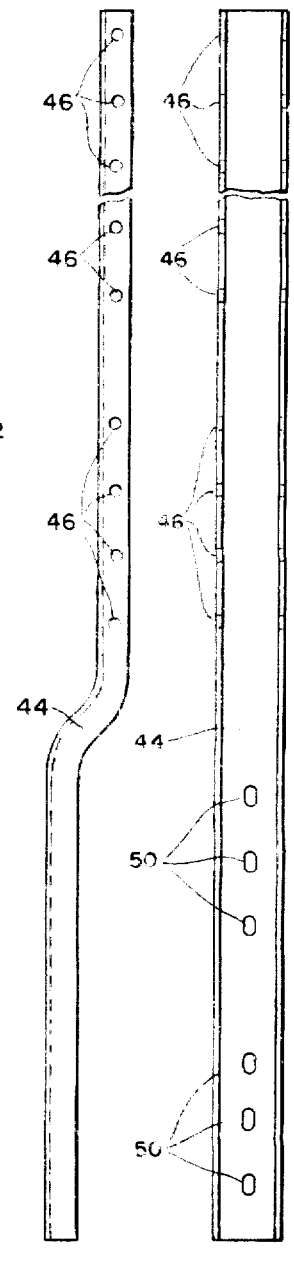
INVENTOR.
WILLIAM B. McDOWELL
BY
Ross M. Campbell Sept. 28, 1965  W. B. McDOWELL  3,208,704
GAS METER MOUNTING BRACKET Filed Nov. 6, 1963  4 Sheets-Sheet 3

INVENTOR.
WILLIAM B. McDOWELL
BY
Ron M. Campbell

Sept. 28, 1965   W. B. McDOWELL   3,208,704
GAS METER MOUNTING BRACKET
Filed Nov. 6, 1963   4 Sheets-Sheet 4

INVENTOR.
WILLIAM B. McDOWELL
BY
*Ross M. Campbell*

United States Patent Office 3,208,704
Patented Sept. 28, 1965

3,208,704
GAS METER MOUNTING BRACKET
William B. McDowell, Plymouth, Mich., assignor to Michigan Tube Benders, Inc., Ann Arbor, Mich., a corporation of Michigan
Filed Nov. 6, 1963, Ser. No. 321,780
2 Claims. (Cl. 248—68)

The present invention relates to mountings for meters and more particularly to a mounting bracket for mounting a gas meter on the outside of a building.

It has been found desirable to place gas meters outside, rather than inside, buildings to which gas is piped, particularly residences, so as to eliminate the necessity of gaining entrance to the building for the purpose of reading or rotating the meter or repairing the installation. Heretofore, gas meter mounting means adapted for connection to a wooden building structure was not adapted for connection to a concrete or cement block building structure. Further, conventional gas meter mounting means permitted the connection and disconnection of meter thereto only with considerable difficulty. Still further, each conventional form of gas meter mounting was adapted for employment with but a single or very few makes and models of gas meters, and could not be used with any other makes or models without substantial modification.

It is accordingly an object of the present invention to provide an improved gas meter mounting bracket.

Another object of the invention is to provide a gas meter mounting bracket adapted for connection to either or both the wooden structure or the cement or concrete block structure of a building.

A further object of the invention is to provide an improved gas meter mounting bracket adapted to facilitate connection and disconnection of several conventional makes and models of gas meters.

A further object of the invention is to provide a gas meter mounting bracket adapted for vertical, longitudinal adjustment.

Still a further object of the invention is to provide a gas meter mounting bracket adapted to support a gas meter with a gas meter by-pass operatively associated therewith.

The above and other objects of the invention which will later become apparent as the following description proceeds, are attained by the present invention, a preferred embodiment of which has been illustrated, by way of example only, in the accompanying drawings, forming a part of this specification in which like characters are employed to designate like parts throughout the same, and wherein:

FIGURE 1 is a front view of a meter mount.
FIGURE 2 is a plan view of a meter mount.
FIGURE 3 is a side view of a meter mount.
FIGURE 4 is a front view of a foundation bracket.
FIGURE 5 is a side view of a foundation bracket.
FIGURE 6 is a side view of a gas meter inlet pipe.
FIGURE 7 is a front view of a gas meter inlet pipe.
FIGURE 8 is a plan view of a gas meter inlet pipe.
FIGURE 9 is a side view of a gas meter outlet pipe.
FIGURE 10 is a front view of a gas meter outlet pipe.
FIGURE 11 is a plan view of a gas meter outlet pipe.
FIGURE 12 is a perspective view of an assembled gas meter mounting bracket mounted on the outside of a building.

Figure 12:
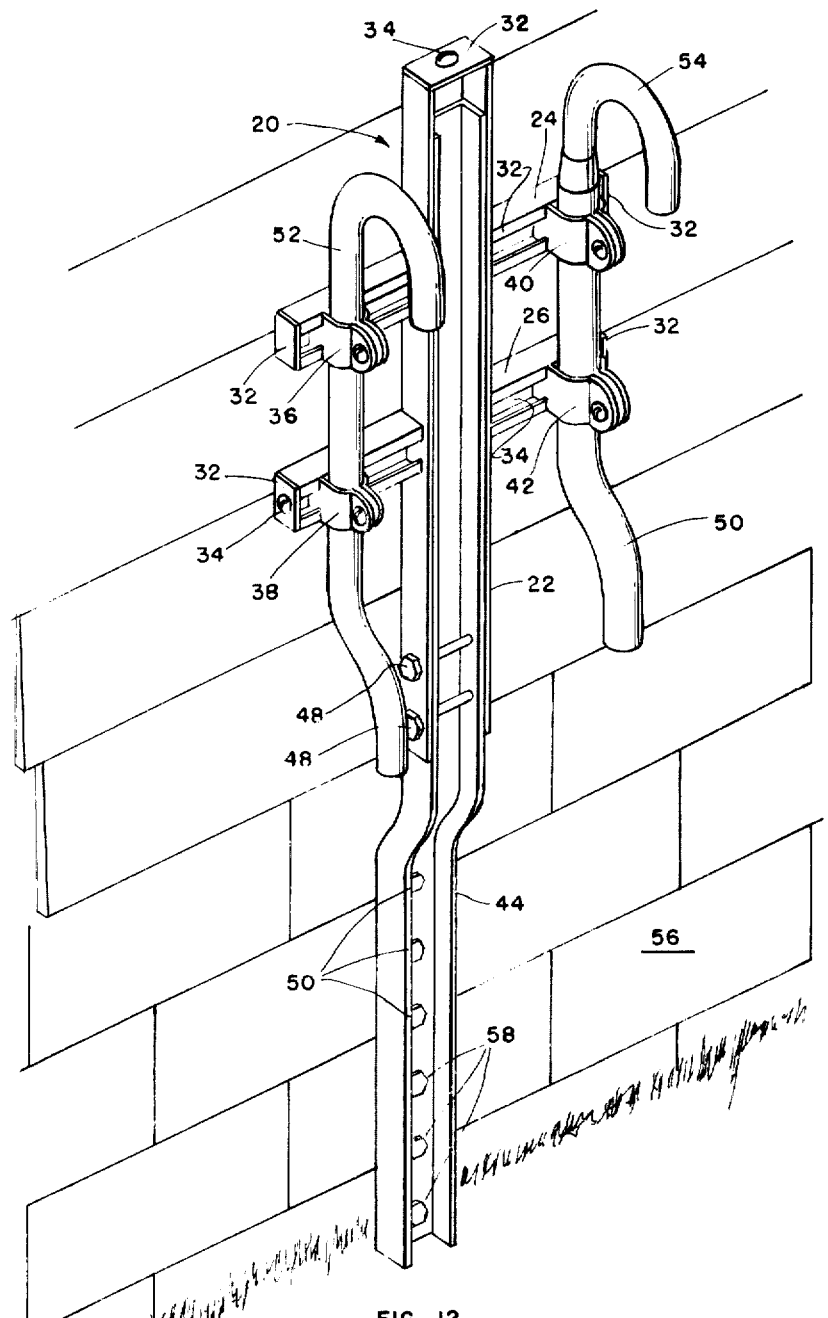

Referring now more particularly to the drawings, generally indicated at 20 is a meter mount, best shown in FIGURES 1, 2, and 3, formed from a vertically arranged channel member 22 of fourteen gauge sheet iron or aluminum formed to a 2.25 inch by 1.125 inch by 1.125 inch outside diameter channel approximately 22.5 inches in length. Four Unistrut channel members are butt welded to the external sides of the flanges of channel member 22 to form a pair of parallel, horizontal upper and lower cross arms 24 and 26 vertically spaced four and one-quarter inches apart, the upper cross member being spaced about seven inches below the top of channel member 22. A pair of slotted apertures 28 are provided in the web portion of channel member 22 and vertically spaced eight and one-quarter inches apart to adapt them for registration with the horizontal joints between rows in a vertical array of standard eight inch cement blocks, or of standard bricks, forming a vertical wall, the center of the upper of said apertures being spaced about one and one-quarter inches from the top of channel member 22. Two pairs of parallel five-sixteenth inch holes 30 are drilled transversely through the flanges of member 22 near the lower end thereof, one of said pairs being vertically spaced two inches above the other. End clips 32, formed of sheet iron or aluminum of approximately one-sixteenth inch thickness are welded across each end of cross arms 24 and 26, and across the upper end of channel member 22, respectively, and are each centrally drilled to threadably receive a three-sixteenth inch by one-half inch aluminum right hand self-threading screw, such a screw and washer assembly 34 being conventionally inserted in those end clips attached to the upper end of channel member 22 and lower cross arm 24.

A pair of Unistrut pipe clamps 36 and 38, adapted to clamp about a three-quarter inch pipe, are connected to cross arms 24 and 26 in the conventional manner near the left hand ends of the assembly (facing same as in FIGURE 1), and a second pair of Unistrut pipe clamps 40 and 42, adapted to clamp about a one inch pipe, are similarly connected to the cross arms, respectively, near the right hand ends thereof.

A foundation bracket 44 is formed from two inch by one inch by one-eighth inch channel iron or aluminum approximately forty inches long and smoothly and symmetrically offset one and one-half inches from a point 14.5 inches from the lower end thereto to a point 17.5 inches from the lower end thereof. A plurality of five-sixteenth inch holes 46 are drilled transversely through the flanges of the upper portion of bracket 44 in parallel, vertically spaced pairs two inches apart, arranged for registration with holes 30 of channel 22 and to receive, respectively, bolt and nut combinations 48 therethrough. A plurality of slotted apertures 50, similar to apertures 46, are provided in the web of the lower portion of bracket 44, spaced similarly to apertures 46 and for the same purpose. If meter mount 20 and bracket 44 are formed of iron or other corrosive material, they are then hot dip galvanized to prevent corrosion.

A gas meter inlet pipe 52 is then formed from three-quarter inch steel pipe having a 0.113 inch minimum wall thickness by offsetting such 1.25 inches from a point 2.50 inches from the lower end thereof to a point 3.0 inches from the lower end thereof, and forming a 180° bend about a radius 3.125 inches at the upper end thereof within a plane forming an angle of 17° inwardly from the longitudinal plane in which the offset position lies (i.e., to the right as viewed from a position facing the front of the assembly), so that the curved end projects downward 1.50 inches below an imaginary line passing horizontally through said radius, as best shown in FIGURES 6, 7, and 8. A gas meter outlet pipe 54 is formed from one inch or, for some installations, one and one-quarter inch seamless steel pipe having a minimum wall thickness of 0.133 inch smoothly and symmetrically swaged to a diameter of three-quarters inch from a point 15.5 inches above the lower end thereof to a point 16.5 inches above the lower end thereof. Outlet pipe 54 is offset, provided with a 180° bend at its upper end, and the bend inclined inwardly 17° so as to be symmetrical with inlet pipe 48. The inward 17° plane of the 180° turn in outlet pipe 54, however, is to the left as viewed from a position facing the front of the assembly. The ends of inlet pipe 52 and outlet pipe 54 are then provided with conventional threads to adapt them for connection to conventional gas meters and gas lines.

To assemble the gas meter mounting bracket, channel member 22 of meter mount 20 is slipping downwardly upon and embracing the upper portion of foundation bracket 44 until holes 30 are aligned with the desired pairs of holes 46 in the bracket, in which position they are secured by nut and bolt combinations 48. It will be noted that meter mount 20 may be slidably adjusted upward or downward upon foundation bracket 44 for a distance of up to 18.0 inches when nut and bolt combinations 48 are positioned through selected holes 46 in order to move channel member 22 to a desired height and thereby moving the gas meter as desired.

The lower portion of foundation bracket 44 is then firmly attached to the concrete, brick, or cement block foundation 56 of the building by insertion of expansion bolts 58 or self-drilling snap-off concrete anchors and bolts through holes 50 and into the concrete wall or the mortar joints between the blocks or brick. A Ramset may also be used for the same purpose. The upper portion of bracket 44, and meter mount 20, then rest flush against the side of the building, the offset portion of bracket 44 accommodating the conventional overhang of foundation 56 by the siding.

Inlet pipe 52 and outlet pipe 54 are then clamped securely within pipe clamps 36 and 38, and 40 and 42, respectively.

Figure 13:
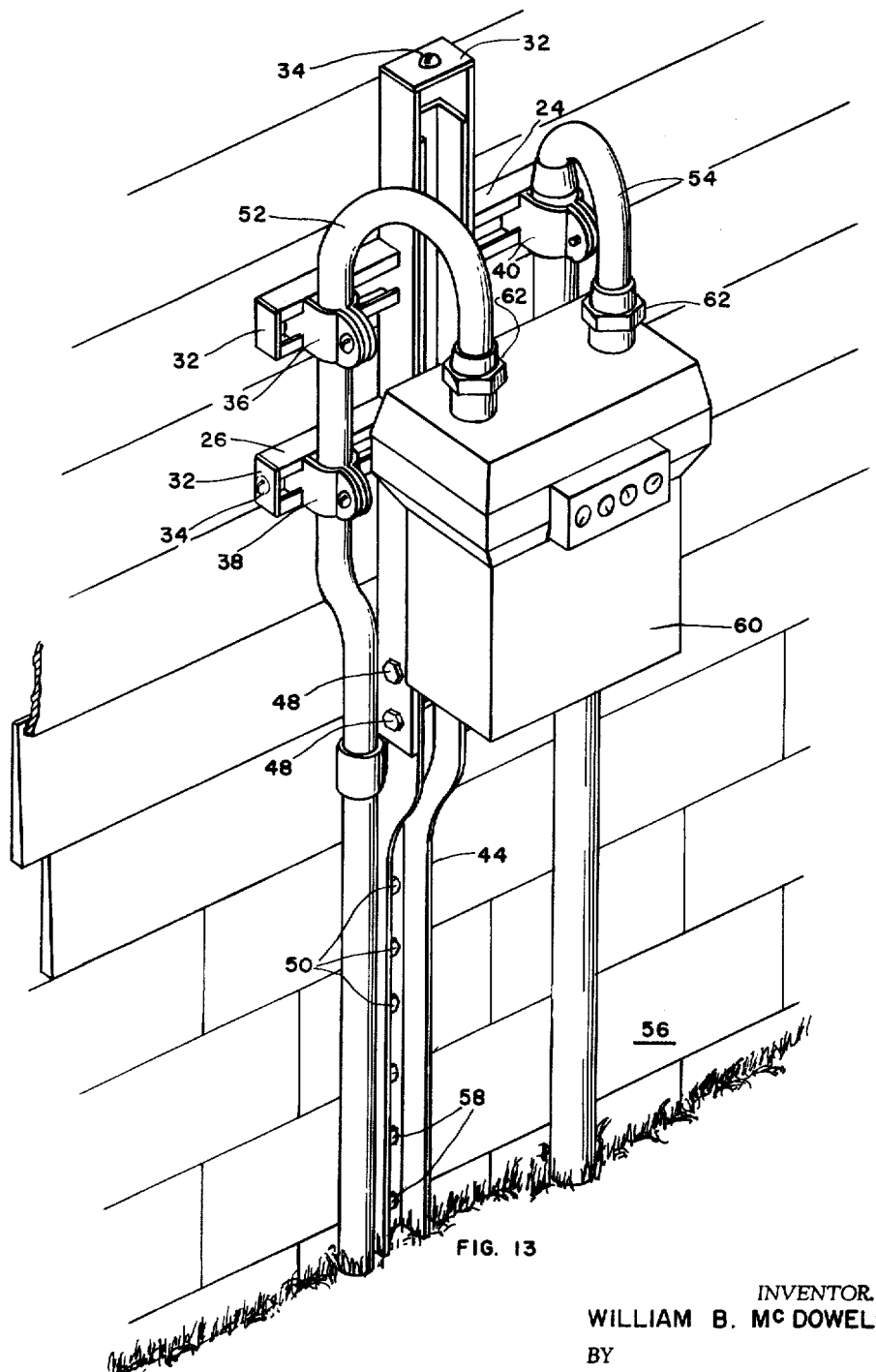
FIGURE 13 is a perspective view of an operatively connected conventional gas meter supported by a gas meter mounting bracket mounted on the outside of a building.

When thus assembled and emplaced, the gas meter mounting bracket is prepared to operatively support a conventional gas meter 60, by conventional couplings 62, 62, as best shown in FIGURE 13. The bracket is of sufficient strength to safely prevent undue strain on the meter installation resulting from settling of the service line, while enabling the meter to be installed, rotated, or repaired with facility and dispatch.

Where it is desired to mount a gas meter on the side of a building which overhangs the foundation a distance substantially in excess of the one and one-half inch offset of bracket 44, or where the foundation is of rock or remains to be bricked, meter mount 20 may be used alone, without the bracket, and be affixed to the side of the building by explosion bolts, anchors and bolts or screws.

Figure 14:
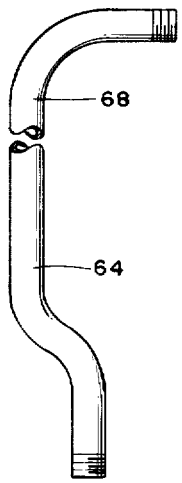
FIGURE 14 is a side view of a modified form of a gas meter inlet pipe.
Figure 15:
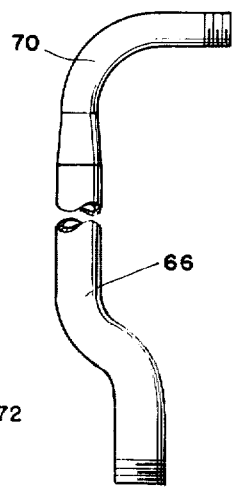
FIGURE 15 is a modified form of a gas meter outlet pipe.
Figure 16:
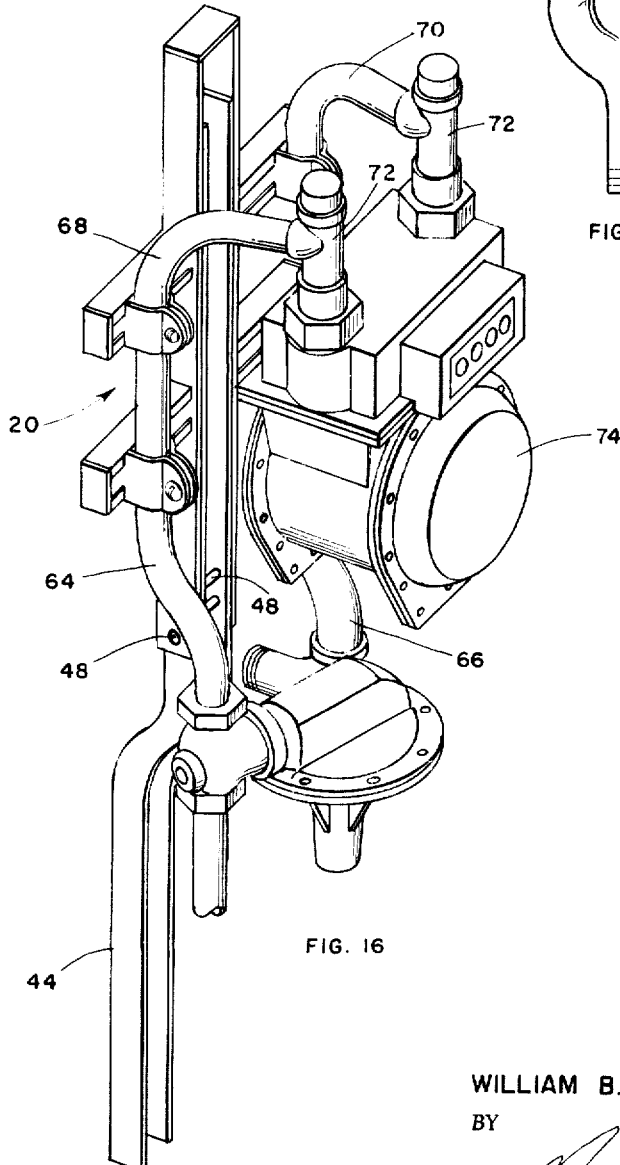
FIGURE 16 is a perspective view of a modified form of gas meter mounting bracket supporting a gas meter with a portion of a by-pass T assembly operatively connected thereto.

A modified form of the invention is shown in FIGURES 14, 15, and 16, and includes an inlet pipe 64 and an outlet pipe 66 having 90° bends, shown at 68 and 70, respectively, rather than 180° bends, in the upper ends thereof, as shown to adapt said upper ends for threadable connection with the T portions 72, 72 of a conventional by-pass T assembly which, in turn, connect with the conventional inlet and outlet of a conventional gas meter 74 and provide gas by-pass means therefor.

It is to be understood that the forms of the invention herewith shown and described are to be taken as preferred embodiments of the same and that resort may be had to various changes in construction without departing from the scope of the subjoined claims.

What is claimed is:

1. Gas meter mounting means comprising a vertical channel upright, four channel members extending laterally and symmetrically in pairs from the external sides of the flanges of said vertical channel upright to form a pair of spaced, parallel upper and lower cross arms with their respective channels facing horizontally, a gas meter inlet pipe and a gas meter outlet pipe, each having forwardly offset lower portion and an upper portion provided with a forward curvature of at least 90° of arc, adapted for operative connection to the gas inlet and gas outlet, respectively, of a gas meter, and pipe clamps slidably mounted at the outer ends of said crossarms, respectively, to support said gas inlet pipe and gas outlet pipe in spaced, parallel, vertical arrangement with said gas meter supported therebetween.

2. Gas meter mounting means comprising an elongated, offset, vertically arranged channel iron having at least two pairs of apertures in the flanges of the upper portion thereof to form a foundation bracket, an elongated, vertical channel upright having at least two pairs of apertures in the flanges of the lower portion thereof arranged for alignment with said apertures in said foundation bracket, means extending through said apertures for rigidly interconnecting said foundation bracket and vertical channel member when said apertures are in alignment, four channel members extending laterally and symmetrically in pairs from the external sides of the flanges of said vertical channel member to form a pair of spaced, parallel upper and lower crossarms with their respective channels facing horizontally, a gas meter inlet pipe and a gas meter outlet pipe each having forwardly offset lower portion and an upper portion provided with a forward curvature of at least 90° of arc, adapted for operative connection to the gas inlet and gas outlet, respectively, of a gas meter, and pipe clamps slidably mounted at the outer ends of said crossarms, respectively, to support said gas inlet pipe and gas outlet pipe in spaced, parallel, vertical arrangement with said gas meter supported therebetween.

References Cited by the Examiner

UNITED STATES PATENTS

| | | | |
|---|---|---|---|
| 1,097,273 | 5/14 | Tyler | 248—68 X |
| 1,356,040 | 10/20 | Caskey | 248—68 X |
| 1,537,772 | 5/25 | Hitzler | 248—229 X |
| 1,801,993 | 4/31 | Beckwith | 248—68 |
| 1,816,984 | 8/31 | Miller | 248—49 |
| 2,535,427 | 12/50 | Kindorf | 248—68 |
| 2,701,928 | 2/55 | Keenan et al. | 248—221 X |
| 2,984,440 | 5/61 | Simons | 248—28 |

CLAUDE A. LE ROY, *Primary Examiner.*